(12) United States Patent
Bombard

(10) Patent No.: US 6,371,514 B1
(45) Date of Patent: Apr. 16, 2002

(54) AIR BAG MODULE MOUNTED IN VEHICLE DOOR

(75) Inventor: Matthew G. Bombard, Washington, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 09/579,651

(22) Filed: May 26, 2000

(51) Int. Cl.⁷ ............................................... B60R 21/22
(52) U.S. Cl. ................................. 280/730.2; 280/728.2; 296/146.1
(58) Field of Search ........................... 280/728.1, 728.2, 280/730.1, 730.2, 743.1; 296/146.1, 146.5, 149

(56) References Cited

U.S. PATENT DOCUMENTS

| | | | |
|---|---|---|---|
| 3,791,667 A | | 2/1974 | Haviland |
| 4,943,109 A | * | 7/1990 | Skibina et al. ............... 296/146 |
| 5,033,236 A | * | 7/1991 | Szerdahelyi et al. ..... 280/730.2 |
| 5,172,790 A | * | 12/1992 | Ishikawa et al. .......... 280/730.2 |
| 5,224,733 A | * | 7/1993 | Simsic ..................... 280/730.2 |
| 5,431,435 A | * | 7/1995 | Wilson ..................... 280/728.1 |
| 5,531,477 A | * | 7/1996 | Madrigal et al. ......... 280/743.1 |
| 5,538,099 A | * | 7/1996 | Blackburn et al. ....... 280/730.2 |
| 5,645,295 A | | 7/1997 | White, Jr. et al. |
| 5,647,609 A | * | 7/1997 | Spencer et al. .......... 280/730.2 |
| 5,718,449 A | * | 2/1998 | Numazawa et al. ..... 280/730.2 |
| 5,743,010 A | * | 4/1998 | Zaguskin et al. ............. 29/857 |
| 5,879,046 A | * | 3/1999 | Kalis, Jr. .................. 296/146.5 |
| 5,997,032 A | * | 12/1999 | Miwa et al. .............. 280/730.2 |
| 6,076,882 A | * | 7/2000 | Szerdahelyi et al. ..... 280/730.2 |
| 6,086,091 A | * | 7/2000 | Heinz et al. .............. 280/728.2 |
| 6,186,534 B1 | * | 2/2001 | Heinz ....................... 280/728.2 |
| 6,189,916 B1 | * | 2/2001 | Bowers et al. ........... 280/730.2 |

OTHER PUBLICATIONS

Co-pending U.S. Pat. application Ser. No. 09/211,194, filed Dec. 15, 1998, entitled "Air Bag Module with Deployment Door".

* cited by examiner

Primary Examiner—J. J. Swann
Assistant Examiner—Christopher Bottorff
(74) Attorney, Agent, or Firm—Tarolli, Sundheim, Covell, Tummino & Szabo L.L.P.

(57) ABSTRACT

An apparatus (10) for helping to protect an occupant of a vehicle (11) in the event of a side impact to the vehicle comprises a vehicle door (30) for location adjacent to and outboard of a vehicle seat (38). An air bag module (12) mounted in the door (30) includes an air bag (14) and an actuatable inflator (16) for inflating the air bag from a deflated condition stowed in the door to an inflated condition extending inboard from the door. The vehicle door (30) comprises a structural door panel (32), at least one exterior skin panel (36) supported on the structural panel, and at least one interior trim panel (34) supported on the structural door panel. The structural door panel (32) is formed as one piece and has module portions (50) disposed between the interior trim panel (34) and the exterior skin panel (36). The module portions (50) define a recess (52) in the structural door panel (32) for receiving and supporting the module (12). The structural door panel (32) further defines a deployment opening (58) through which the air bag (14) is inflatable from the recess (52).

17 Claims, 3 Drawing Sheets

AIR BAG MODULE MOUNTED IN VEHICLE DOOR

BACKGROUND OF THE INVENTION

1. Technical Field

The present invention relates to an occupant protection apparatus for helping to protect an occupant of a vehicle in the event of a side impact to the vehicle. In particular, the present invention relates to the mounting of a side impact air bag module in a door of a vehicle.

2. Description of the Prior Art

It is known to mount an air bag in a door of a vehicle. The air bag is inflatable into the vehicle occupant compartment to help protect a vehicle occupant in the event of a side impact to the vehicle.

Some known air bag modules include an air bag that surrounds an inflator to provide the module with a soft or flexible external surface. It is known to position this type of module inside a reaction canister that is mounted in the vehicle door. The reaction canister is a separate housing, which is attached to the vehicle door structure and which provides structural support for the air bag module prior to and during deployment of the air bag.

SUMMARY OF THE INVENTION

The present invention is a vehicle occupant protection apparatus for helping to protect an occupant of a vehicle in the event of a side impact to the vehicle. The vehicle has a seat for the occupant. The apparatus comprises a vehicle door for location adjacent to and outboard of the vehicle seat. An air bag module mounted in the door includes an air bag and an actuatable inflator for inflating the air bag from a deflated condition stowed in the door to an inflated condition extending inboard from the door. The vehicle door comprises a structural door panel, at least one exterior skin panel supported on the structural panel, and at least one interior trim panel supported on the structural door panel. The structural door panel is formed as one piece and has module portions disposed between the interior trim panel and the exterior skin panel. The module portions define a recess in the structural door panel for receiving and supporting the air bag module. The structural door panel further defines a deployment opening through which the air bag is inflatable from the recess.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF EMBODIMENTS OF THE INVENTION

Figure 1:
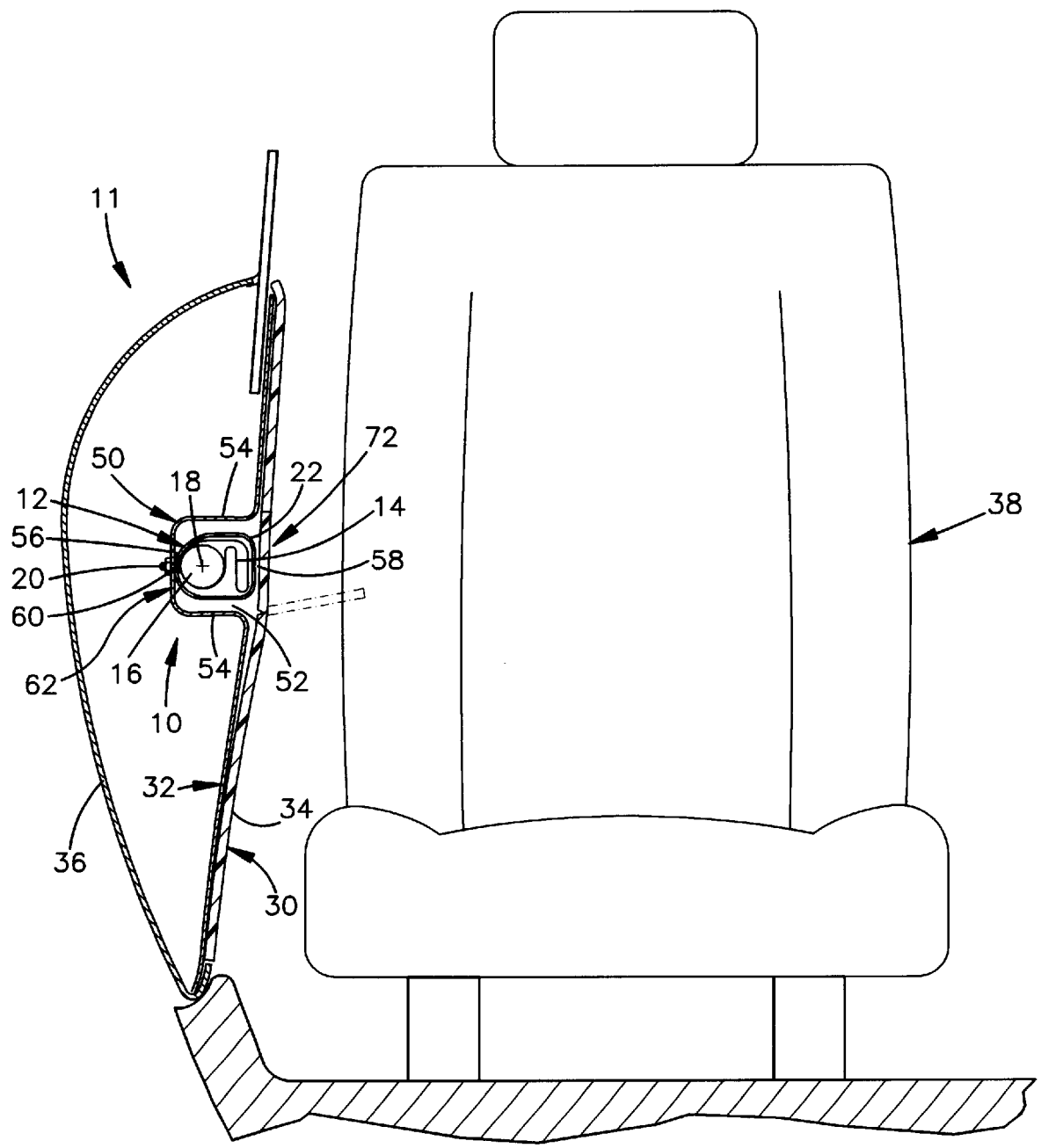
FIG. 1 is a schematic side sectional view of a vehicle door including an air bag module constructed in accordance with a first embodiment of the present invention.
Figure 2:
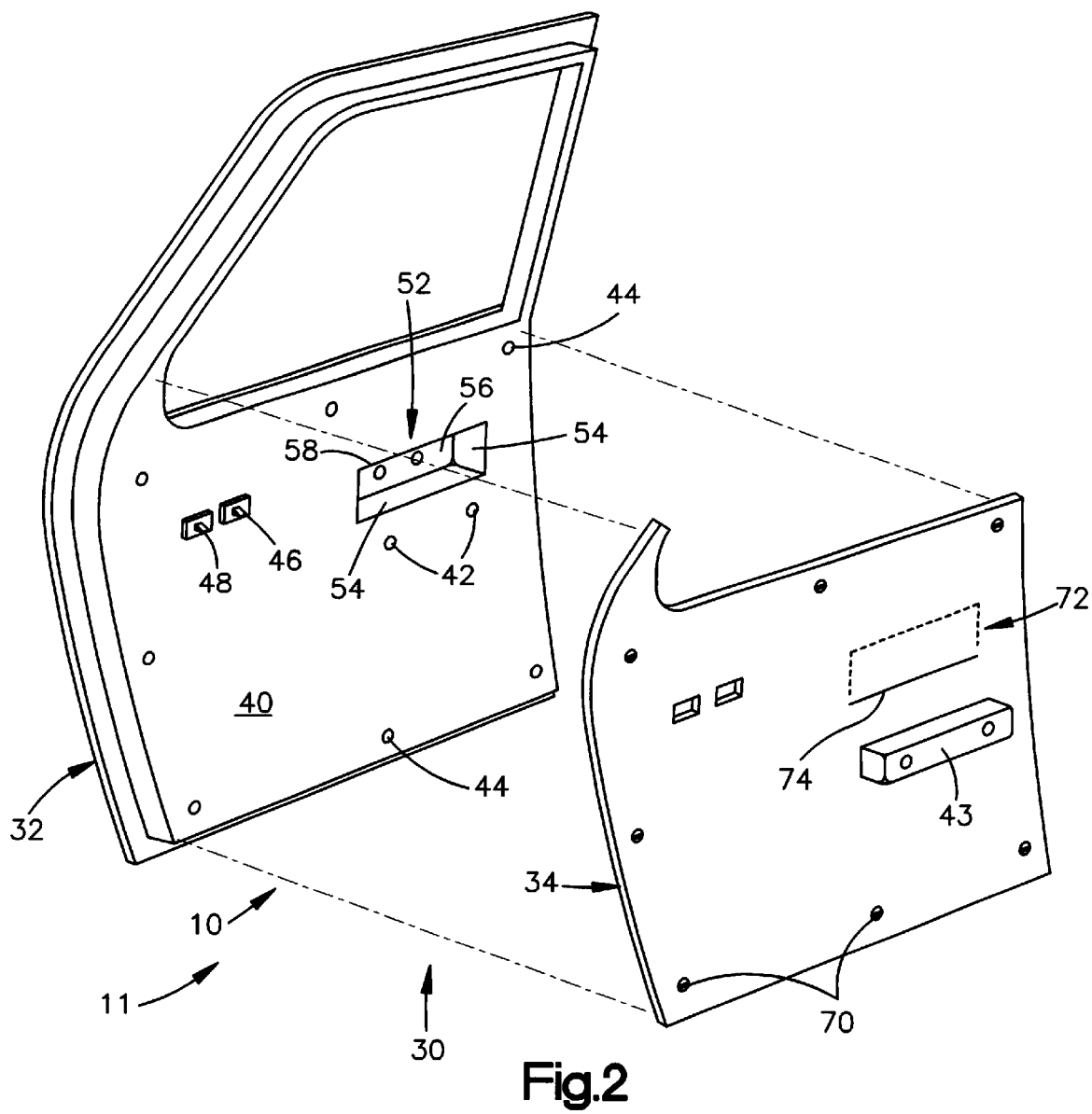
FIG. 2 is an exploded perspective view of portions of the door of FIG. 1.
Figure 3:
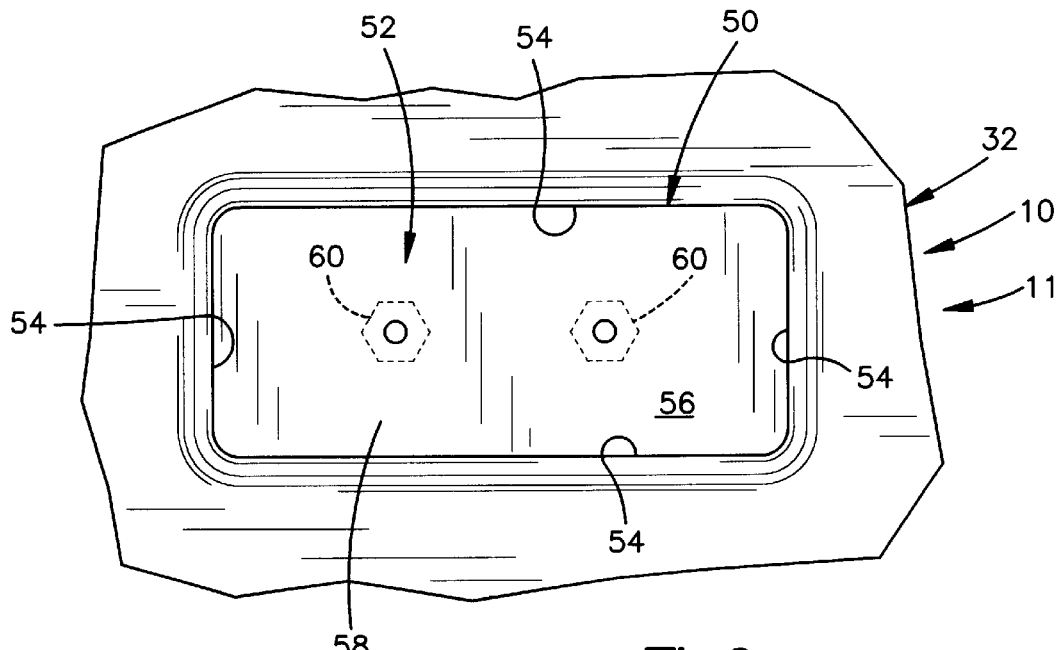
FIG. 3 is an elevational view of a portion of the door of FIG. 1.

The present invention relates to an occupant protection apparatus for helping to protect an occupant of a vehicle in the event of a side impact to the vehicle. In particular, the present invention relates to the mounting of a side impact air bag module in a door of a vehicle. As representative of the present invention, FIGS. 1–3 illustrate an occupant protection apparatus 10 incorporated in a vehicle 11. The apparatus 10 includes an air bag module 12.

The module 12 is preferably of the type shown in U.S. Pat. No. 5,645,295, entitled Seat Mounted Air Bag Module. Specifically, the air bag module 12 includes a particular type of inflatable device, illustrated schematically at 14, which is commonly known as an air bag. The air bag 14 is preferably made from a fabric material, such as woven nylon. The air bag 14 can alternatively be made from a non-woven material, such as plastic film. The use of plastic film, in particular, would require one or more inflation fluid vents to be formed in the air bag 14, as is known in the art.

The air bag module 12 also includes an inflator assembly indicated schematically at 16, which includes an inflator in a diffuser. The inflator preferably contains a stored quantity of pressurized inflation fluid and an ignitable material for heating the inflation fluid. The module 12 alternatively could include an inflator that uses the combustion of gas-generating material to generate inflation fluid in the form of gas to inflate the air bag 14, or an inflator that contains only a stored quantity of pressurized inflation fluid for inflating the air bag.

A series of fluid outlets (not shown) are formed in the inflator assembly 16 for directing inflation fluid to flow from the inflator assembly into the air bag 14. The fluid outlets are arranged in a straight line that extends parallel to a longitudinal central axis 18 of the module 12. A pair of mounting bolts 20 extend radially outward from the inflator assembly 16 opposite the fluid outlets.

The inflator assembly 16 is disposed inside the air bag 14. Specifically, the air bag 14 is formed with a pocket (not shown) into which the inflator assembly 16 is placed with its fluid outlets inside the air bag. The mounting bolts 20 extend through openings (not shown) in the air bag 14. The air bag 14 is folded or otherwise packed around the inflator assembly 16 to help provide a relatively soft exterior for the air bag module 12.

The air bag module 12 includes a cover 22 (FIGS. 2 and 4) for enclosing the air bag 14 and the inflator assembly 16. The cover 22 is made from a material that is strong enough to protect the parts of the air bag module 12 that are enclosed within the cover. At the same time, the cover 22 is flexible enough that, in conjunction with the air bag 14, the resulting air bag module 12 is a "soft pack" with a relatively soft exterior. The cover 22 is rupturable in response to inflation of the air bag 14 to enable deployment of the air bag, as described below.

The occupant protection apparatus 10 includes a door 30 of the vehicle 11. The door 30 includes a structural door panel 32, an interior trim panel 34, and an exterior skin panel 36. The structural door panel 32 is the portion of the door 30 that supports the interior trim panel 34, the exterior skin panel 36, and the associated door and window hardware. The door 30 is located outboard of a vehicle seat 38.

The structural door panel 32 is formed as one piece, preferably by stamping from sheet metal. The structural door panel 32 could, alternatively, be injection molded from plastic. The structural door panel 32 has an inner major side portion 40, which is presented toward the vehicle occupant compartment. The inner major side portion 40 includes a plurality of fastener openings, including fastener openings 42 for receiving fasteners to support an armrest 43 of the door 30 and fastener openings 44 for receiving fasteners to support the interior trim panel 34 of the door. The inner major side portion 40 also supports a number of hardware portions of the door 30, for example, a power window control switch 46 and a door lock switch 48.

The structural door panel 32 has module portions 50 defining a recess 52 in the structural door panel for receiving and supporting the air bag module 12. The module portions 50 include a plurality of side walls 54, which extend from the inner major side portion 40 in a direction toward the exterior skin panel 36. The module portions 50 also include a back wall 56. The back wall 56 extends between and interconnects the side walls 54 to provide the recess 52 with a generally rectangular or box-shaped configuration.

The structural door panel 32 defines a deployment opening 58 through which the air bag 14 is inflatable from the recess 52. The deployment opening 58 is formed in the inner major side portion 40 of the structural door panel 32.

The fastener openings 42 for receiving fasteners for supporting an armrest of the door 30 are located beneath the deployment opening 58 in the structural door panel 32. The fastener openings 44 for receiving fasteners for supporting the interior trim panel 34 of the door 30 are disposed in an array extending around the deployment opening 58 and around the first fastener openings 42, at a location adjacent to the outer periphery of the structural door panel 32. The power window control switch 46 and the door lock switch 48 are located within the array of fastener openings 44, at a location forward of the deployment opening 58 in the structural door panel 32.

The assembled air bag module 12 is fastened to the module portions 50 of the structural door panel 32 in a force-transmitting relationship. Specifically, the module 12 is rigidly affixed by the mounting bolts 20 to the back wall 56 of the structural door panel 32. A pair of nuts 60 are screwed onto the mounting bolts 20 to secure the module 12 to the structural door panel 32. When the air bag module 12 is mounted on the structural door panel 32, the central longitudinal axis 18 of the module extends horizontally.

The module portions 50 of the structural door panel 32 form a reaction housing 62 for receiving reaction force from the inflator assembly 16 upon actuation of the inflator. Because the module portions 50 of the structural door panel 32 support the module 12 directly, no separate reaction housing or reaction canister is needed.

The interior trim panel 34 of the door 30 is secured to the structural door panel 32 by a series of fasteners 70. The interior trim panel 34 includes a deployment door 72, which extends across and closes the deployment opening 58. The deployment door 72 is movable relative to the module 12. A lower edge 74 of the deployment door 72 is hinged to the remainder of the interior trim panel 34. The other edges of the deployment door 72 are releasably secured to the interior trim panel 34 by a weakened portion of the trim panel such as a tear seam.

The vehicle 11 in which the protection apparatus 10 is mounted includes known electrical means (not shown) for sensing a side impact to the vehicle and for actuating the inflator assembly 16 in response to the sensing of a side impact. The means may include a side impact sensor and vehicle circuitry for electrically actuating the inflator assembly 16 in response to sensing a side impact to the vehicle greater than a predetermined threshold value. The means is electrically connected with the inflator assembly 16, via lead wires (not shown), for providing an actuation signal to the inflator assembly.

In the event of a side impact to the vehicle 11 of a magnitude greater than the predetermined threshold value, the inflator assembly 16 is actuated by the electrical means. Inflation fluid flows out of the inflator assembly 16 into the air bag 14 and causes the air bag to inflate from a deflated condition stowed in the door 30 to an inflated condition. The force of the inflating air bag 14 is applied against the inside of the deployment door 72.

The reaction force from the inflator assembly 16 is applied to the back wall portion 56 of the structural door panel 32. The force of the inflating air bag 14 causes the deployment door 72 to be pivoted outward about its lower edge 74, thereby uncovering the deployment opening 58. The air bag 14 inflates through the deployment opening 58 to extend inboard from the door 30 into the vehicle occupant compartment 42 to help protect the vehicle occupant.

Figure 4:
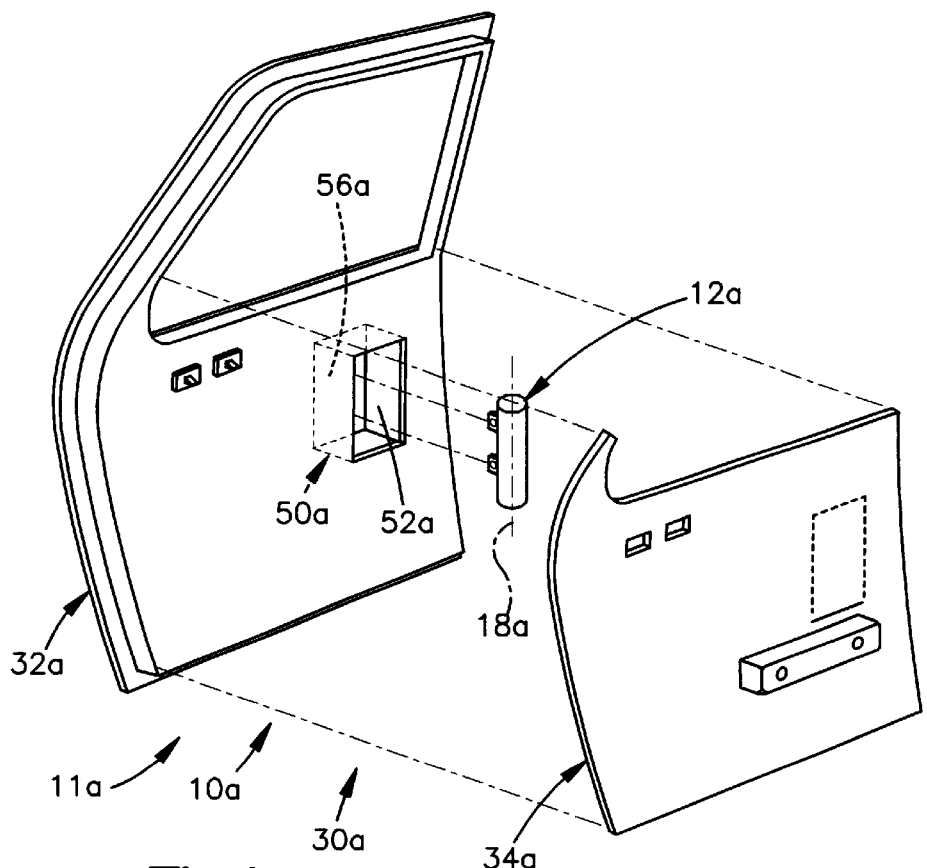
FIG. 4 is a perspective view similar to FIG. 2 of a vehicle door constructed in accordance with a second embodiment of the invention.

FIG. 4 illustrates a vehicle occupant protection apparatus 10a in accordance with a second embodiment of the invention. The apparatus 10a is similar in construction to the apparatus 10 (FIGS. 1–3) and parts that are the same are given the same reference numerals with the suffix "a" attached. In the apparatus 10a, the module 12a has a longitudinal central axis 18a, which extends vertically in the door 30a, rather than horizontally like the axis 18 of the module 12. The module 12a is secured to the back wall 56a of the structural door panel 32a of the door 30a.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus for helping to protect an occupant of a vehicle in the event of a side impact to the vehicle, the vehicle having a seat for the occupant, said apparatus comprising:

a vehicle door for location adjacent to and outboard of the vehicle seat; and an air bag module mounted in said door, said air bag module including an air bag and an actuatable inflator for inflating said air bag from a deflated condition stowed in said door to an inflated condition extending inboard from said door;

said vehicle door comprising a structural door panel, at least one exterior skin panel supported on said structural panel, and at least one interior trim panel supported on said structural door panel;

said structural door panel being formed as one piece and having module portions disposed between said interior trim panel and said exterior skin panel, said module portions defining a recess in said structural door panel for receiving and supporting said air bag module, said structural door panel further defining a deployment opening through which said air bag is inflatable from said recess.

2. An apparatus as set forth in claim 1 wherein said air bag module is fastened to said module portions of said structural door panel in a force-transmitting relationship and said module portions form a reaction housing for receiving reaction force from said inflator upon actuation of said inflator.

3. An apparatus as set forth in claim 1 wherein said one-piece structural door panel has an inner major side portion, said deployment opening being formed in said inner major side portion, said module portions extending from said deployment opening in said inner major side portion in a direction toward said exterior skin panel.

4. An apparatus as set forth in claim 3 wherein said module portions comprise side wall portions which extend from said inner major side portion in a direction toward said exterior skin panel and a back wall portion which extends between and interconnects said side wall portions, said recess having a generally rectangular configuration.

5. An apparatus as set forth in claim 1 wherein said structural door panel is stamped as one piece from sheet metal.

6. An apparatus as set forth in claim 1 wherein said module has a longitudinal central axis that extends generally horizontally in said door.

7. An apparatus as set forth in claim 1 wherein said module has a longitudinal central axis that extends generally vertically in said door.

8. An apparatus as set forth in claim 1 wherein said air bag module comprises a soft pack air bag module that is free of a reaction housing, said air bag having a body portion defining an inflation fluid volume and a mouth portion for directing inflation fluid from said inflator into said body portion, said mouth portion of said air bag being wrapped around said inflator so that said inflator has a fluid outlet located inside said inflation fluid volume of said air bag, said module further including a cover at least partially enclosing said air bag and said inflator so that said air bag is packed with said inflator for movement with said inflator and said cover, said module portions of said one-piece structural door panel forming a reaction housing for receiving reaction force from said inflator upon actuation of said inflator, said module being fastened to said module portions of said one-piece structural door panel.

9. An apparatus for helping to protect an occupant of a vehicle in the event of a side impact to the vehicle, the vehicle having a seat for the occupant, said apparatus comprising:

a vehicle door for location adjacent to and outboard of the vehicle seat, said vehicle door comprising a one-piece structural door panel, an exterior skin panel supported on said one-piece structural door panel, and an interior trim panel supported on said one-piece structural door panel; and an air bag module mounted in said door, said module being free of a reaction housing, said module comprising an air bag and an actuatable inflator for inflating said air bag, said inflator having a fluid outlet located inside said air bag, said module further including a cover at least partially enclosing said air bag and said inflator so that said air bag is packed with said inflator for movement with said inflator and said cover;

said one-piece structural door panel having module portions forming a reaction housing for receiving reaction force from said inflator upon actuation of said inflator, said module being fastened to said reaction housing portion of said one-piece structural door panel.

10. An apparatus as set forth in claim 9 wherein said structural door panel is stamped as one piece from sheet metal.

11. An apparatus for helping to protect an occupant of a vehicle in the event of a side impact to the vehicle, the vehicle having a seat for the occupant, said apparatus comprising:

a vehicle door for location adjacent to and outboard of the vehicle seat; and an air bag module mounted in said door, said air bag module including an air bag and an actuatable inflator for inflating said air bag from a deflated condition stowed in said door to an inflated condition extending inboard from said door;

said vehicle door comprising a structural door panel, at least one exterior skin panel supported on said structural panel, and at least one interior trim panel supported on said structural door panel;

said structural door panel being formed as one piece and having module portions disposed between said interior trim panel and said exterior skin panel, said module portions defining a recess in said structural door panel for receiving and supporting said air bag module, said structural door panel further defining a deployment opening through which said air bag is inflatable from said recess;

said structural door panel having an inner major side portion that is presented toward the vehicle occupant compartment;

said inner major side portion of said one piece structural door panel including a plurality of fastener openings, said plurality of fastener openings including first fastener openings for receiving fasteners for supporting an armrest of it said door and second fastener openings for receiving fasteners for supporting said interior trim panel of said door.

12. An apparatus as set forth in claim 11 further comprising a power window control switch and a door lock switch, and wherein said inner major side portion of said one piece structural door panel supports said power window control switch and said door lock switch.

13. An apparatus as set forth in claim 12 wherein said deployment opening is formed in said inner major side portion of said one piece structural door panel.

14. An apparatus as set forth in claim 13 wherein said air bag module is a soft pack module being free of a reaction housing, said module including mounting bolts that rigidly affix said module to said inner major side portion of said one piece structural door panel, said module portions of said structural door panel forming a reaction housing for receiving reaction force from said air bag module upon actuation of said inflator.

15. An apparatus as set forth in claim 11 wherein said structural door panel is stamped as one piece from sheet metal.

16. An apparatus as set forth in claim 11 wherein said first fastener openings for receiving fasteners for supporting an armrest of said door are located beneath said deployment opening in said structural door panel, and said second fastener openings for receiving fasteners for supporting said interior trim panel of said door are disposed in an array extending around said deployment opening and said first fastener openings, at a location adjacent to the outer periphery of the structural door panel.

17. An apparatus as set forth in claim 16 further comprising a power window control switch and a door lock switch, and wherein said inner major side portion of said structural door panel supports said power window control switch and said door lock switch at a location within said array of first fastener openings, at a location forward of said deployment opening.

* * * * *